United States Patent [19]

Arends et al.

[11] 4,295,489

[45] Oct. 20, 1981

[54] PILOT-OPERATED BACK PRESSURE REGULATOR

[75] Inventors: Roger R. Arends; Wayne B. Bailey, both of Marshalltown; John W. Duffy, Tama; Brice D. Springer, Marshalltown, all of Iowa

[73] Assignee: Fisher Controls Company, Inc., Marshalltown, Iowa

[21] Appl. No.: 81,587

[22] Filed: Oct. 3, 1979

[51] Int. Cl.³ .......................................... F16K 31/365
[52] U.S. Cl. ..................................... 137/488; 251/61
[58] Field of Search ............... 131/488, 489, 491, 494, 131/492, 492.5; 251/61, 282

[56] References Cited

U.S. PATENT DOCUMENTS

| 2,895,501 | 7/1950 | Irwin . |
| 3,001,550 | 9/1961 | Engel . |
| 3,032,054 | 5/1962 | Irwin . |
| 3,097,664 | 7/1963 | Henley ........................... 137/489 X |
| 3,572,382 | 3/1971 | Luthe ............................. 251/282 X |
| 3,722,860 | 3/1973 | Curran ........................... 251/282 X |
| 4,041,973 | 8/1977 | Rice . |
| 4,135,696 | 1/1979 | Saarem . |
| 4,167,262 | 9/1979 | Lemmon ............................. 251/282 |

FOREIGN PATENT DOCUMENTS 2501190 7/1976 Fed. Rep. of Germany ..... 251/61.5

OTHER PUBLICATIONS

Fisher Controls Bulletin 71.2:310, dated Mar. 1974, "Type 310 Pilot Operated Gas Regulator".
Fisher Controls Bulletin 71.4:63EG, dated Apr. 1979, "Type 63EG and 1098-63EGR Pressure Relief Valves".
Kimray Inc. Catalogue, Section A, pp. 1-18, "Regulators-Gas Pilot Operated-125 lb. WP".
Fisher Controls Instruction Manual, Form 1856, Aug. 1975, "63F Series Back Pressure Regulators".

Primary Examiner—Alan Cohan
Attorney, Agent, or Firm—Arthur E. Hoffman

[57] ABSTRACT

A pilot-operated back pressure regulator of simplified design and construction having a balanced valve plug attached to a diaphragm actuator and secured to the regulator body by bolts for ready simultaneous removal of the plug and actuator. The diaphragm divides the actuator into two cavities; a spring cavity acting to close the valve plug and pressure balancing cavity. A pilot valve is in communication with the inlet pressure to the regulator body, the spring cavity and an exhaust to regulate the inlet pressure to flex the diaphragm. In a preferred embodiment O-ring seals are located between (a) the valve plug and the valve seat, (b) the valve plug and its guide, and (c) the valve plug guide and the regulator body.

2 Claims, 3 Drawing Figures

PILOT-OPERATED BACK PRESSURE REGULATOR

BACKGROUND OF THE INVENTION

This invention relates to a pilot-operated back pressure regulator. More particularly this invention relates to a pilot-operated back pressure regulator for use on gas separators in the oil field industry. Even more particularly this invention relates to a pilot-operated back pressure regulator having a pressure balanced valve plug.

DESCRIPTION OF THE PRIOR ART

Pilot-operated back pressure regulators are known. In the prior art regulators, the pressure drop between the inlet and outlet of the valve is the determining factor in the position of the diaphragm which regulates flow through the valve. However, at lower flow rates, minimal differential pressure is exerted on the diaphragm, and the diaphragm has a tendency to modulate which produces instability in the fluid system.

SUMMARY OF THE INVENTION

A pilot-operated back pressure regulator is provided by the present invention. The regulator has a regulator body enclosing an oversized valve plug which is moved reciprocally within the valve body to control the fluid flow through the regulator. The valve plug is moved by a diaphragm and spring operated actuator. The inlet pressure of the regulator is applied to the diaphragm within the actuator to assist the spring operation. The valve plug is oversized; that is, it is larger than the valve plug that would be used in such a pilot-operated back pressure regulator according to the prior art. In addition, the valve plug is pressure balanced so that the forces caused by fluid pressures within the regulator are equal in both the opening and closing directions. The pressure balanced valve plug requires a smaller actuating force; thus it enables the use of a diaphragm having a smaller area which therefore allows the use of a smaller actuator. In addition the balanced valve plug has a more stable operation at lower flow rates than the unbalanced valve plug of prior art back pressure regulators. The larger valve plug of the present invention also provides a bubble tight shutoff that is unavailable with many regulators in the prior art.

The actuator and internal parts of the regulator of the present invention are assembled as a unit which is attached to the regulator body by two bolts such that the internal parts fit within the regulator body and the actuator is rigidly attached to the top of the body.

The primary object of the present invention is to provide a pilot-operated back pressure regulator having a novel balanced valve plug.

Another object of the present invention is to provide a pilot-operated back pressure regulator characterized by simplicity of valve body design, in which the internal parts are constructed so that they may be removed from the valve body for repair or replacement without removing the valve body from the pipeline.

DESCRIPTION OF THE PREFERRED EMBODIMENT

Figure 1:
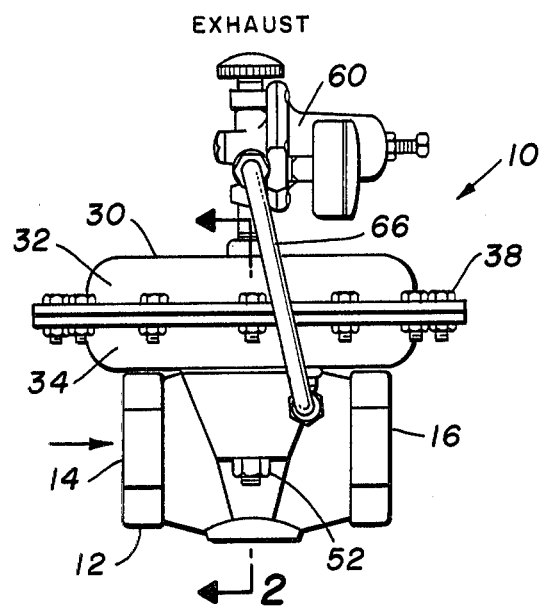
FIG. 1 is a view of the exterior of the pilot-operated back pressure regulator of the present invention.
Figure 2:
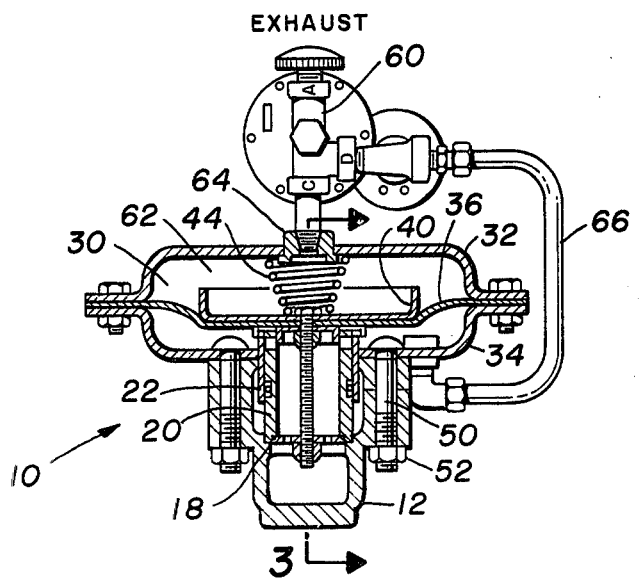
FIG. 2 is a partial sectional view of the regulator shown in FIG. 1 taken along the sectional line 2—2.
Figure 3:
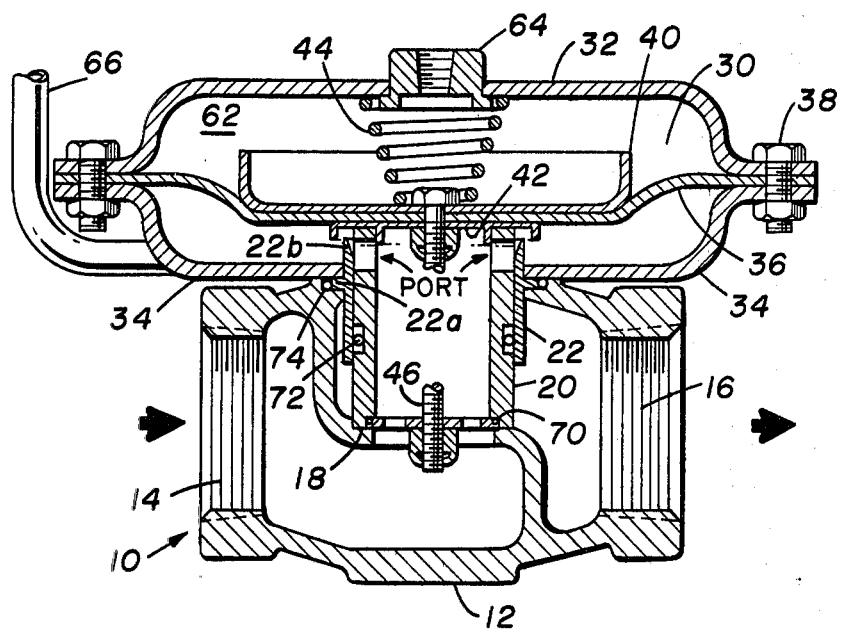
FIG. 3 is a partial sectional view of the regulator of FIGS. 1 and 2 taken along the sectional line 3—3 shown in FIG. 2.

Turning now to the drawings, the pilot-operated back pressure regulator 10 of the present invention is shown. A regulator body 12 is provided which has an inlet 14 and an outlet 16 such that a fluid may flow through the regulator. A valve seat 18 is provided between the inlet 14 and outlet 16 and a valve plug 20 which is reciprocally movable toward and away from the valve seat 18 is provided to regulate the flow of fluid through the regulator.

An actuator 30 formed from an upper casing 32 and a lower casing 34 is provided to move the valve plug 20. A flexible diaphragm 36 is secured within the actuator 30 by bolts 38 which fasten the outer periphery of the diaphragm 36 between the edges of the upper casing 32 and lower casing 34 of actuator 30 when the actuator 30 is assembled. Metallic plates 40 and 42, less than the diameter of the diaphragm 36, are secured on either side of the diaphragm 36 and a spring 44 is held within the upper casing 32 between the inner wall of the upper casting 32 and the metallic plate 40. When the actuator 30 is assembled, bolt 46 rigidly fastens the valve plug 20 to the diaphragm 36. Two bolts 50 are used to attach the assembled actuator 30 and valve plug 20 to the body 12 of the back pressure regulator 10. When the valve plug 20 is inserted within the regulator body 12, held within the valve plug guide 22, and the actuator 30 is properly positioned on the regulator body 12, nuts 52 are used to fasten bolts 50 so that the actuator 30 is rigidly secured to the regulator body 12.

Valve plug guide 22 has a circumferential outer shoulder 22A which rests on an annular groove in regulator body 12 and is secured between said body 12 and lower casing 34 to prevent axial movement of valve plug guide 22.

A conventional unloading pilot valve 60, whose internal details are not shown, is attached to the upper casing 32 of actuator 30 and communicates with the portion of the diaphragm cavity 62 containing the spring 44 through connector 64. Through tubing 66, the pilot valve 60 also communicates with the upstream side of the pilot-operated back pressure regulator 10. Tubing 66 enables the pilot valve to sense the pressure at the upstream side of the pilot-operated back pressure regulator 10 so that it may operate the actuator 30 to change the flow of fluid through the back pressure regulator 10. In the drawings tubing 66 is shown located between the pilot valve 60 and the lower casing 34 of the actuator 30; however, the tubing 66 may easily be adapted to sense the upstream or controlled pressure at a point remote from the back pressure regulator 10.

O-rings are provided in three locations on the valve plug 20 and valve plug guide 22 to provide a bubble tight shutoff for the back pressure regulator 10. O-ring 70 is provided at the seating end of the valve plug 20 to prevent leakage past the valve seat 18 when the regulator 10 is closed. A second O-ring 72 is provided between the valve plug 20 and the valve plug guide 22. The third O-ring 74 is provided between the shoulder 22a of valve plug guide 22 and the regulator body 12. The three O-rings prevent fluid flow between the inlet 14 and outlet 16 of the back pressure regulator 10 when the regulator 10 is closed.

During operation the inlet pressure registers within the inlet 14 to the pilot-operated back pressure regulator 10, the interior of valve plug 20, via the ports in valve plug 20 past the circumferentially beveled top inner edge of valve guide 22 into the space between the outer circumferential lip of plate 42 and valve plug 20 and then through the clearance between said outer lip of plate 42 and the outer periphery of valve plug guide 22 into the cavity on the underside of the diaphragm 36, that is within the cavity formed by the diaphragm 36, and the lower casing 34 of actuator 30. The inlet pressure is also transmitted by tubing 66 to the pilot valve 60. As long as the inlet pressure is lower than the set pressure for actuation of the back pressure regulator 10, the pilot valve 60 closes the exhaust to prevent the exhausting of pressure from the spring portion 62 of the diaphragm cavity within the actuator 30. In this position inlet pressure is allowed to enter the spring portion 62 of the diaphragm cavity to also keep the back pressure regulator 10 closed.

When the inlet pressure is equal to the set pressure, the pilot valve 60 moves slightly. The exhaust path remains closed. The path transmitting the inlet pressure to the spring portion 62 of the diaphragm cavity is also closed; thus, pressure is unable to enter or leave the spring portion 62 of the diaphragm cavity within the actuator 30.

As the inlet pressure rises above the set pressure, the pilot valve 60 opens the exhaust port to allow the pressure within the spring portion 62 of the diaphragm cavity to exhaust to atmosphere. Now the inlet pressure on the bottom of diaphragm 36 overcomes the force exerted by spring 44 and the pilot operated back pressure regulator 10 opens to reduce the inlet pressure. When the inlet pressure again falls to the set pressure, the pilot valve 60 closes the exhaust. The inlet pressure is then applied to both sides of diaphragm 60 and to the balanced valve plug 20. With the equalization of pressures, the spring 44 closes the back pressure regulator 10.

Repair of the back pressure regulator is simplified by its valve body design. The removal of nuts 52 allows the actuator 30 and the internal parts of the regulator 10, for example the valve plug 20 and valve plug guide 22, to be removed from the regulator body 12 without removing the regulator body 12 from the pipeline. The removed parts may then be repaired or replaced and reinstalled in the regulator body.

In view of the above, it will be seen that the several objects of the invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

What is claimed is:

1. A pilot-operated back pressure regulator comprising:
   (a) A regulator body having an inlet and an outlet, a valve seat located between said inlet and outlet and a valve plug guide above said valve seat;
   (b) a pressure balanced valve plug within said valve plug guide adjacent to said valve seat and movable reciprocally toward and away from said valve seat, said valve plug being ported at the end thereof remote from the end which seats on said valve seat;
   (c) an actuator having a flexible diaphragm forming a spring cavity and a lower cavity within said actuator, said spring cavity containing a spring for closing said valve plug against said valve seat and said lower cavity accepting said ported portion of said valve plug;
   (d) said valve plug being directly attached to said diaphragm such tht flexure of said diaphragm operates said valve plug to open or close said back pressure regulator by moving said valve plug away from or toward, respectively, said valve seat;
   (e) a plurality of bolts securing said actuator to said regulator body whereby removal of said plurality of bolts allows simultaneous removal of said actuator and said valve plug from said regulator body; and
   (f) a pilot valve in communication with the inlet pressure, with said spring cavity, and with an exhaust whereby said pilot valve operates said actuator.

2. The pilot operated back pressure regulator of claim 1 further comprising an O-ring on said valve plug between said valve plug and said valve seat;
   a second O-ring between said valve plug and said valve plug guide; and
   a third O-ring between said valve plug guide and said regulator body whereby the paths between said regulator body inlet and said regulator body outlet are sealed to seal said pilot operated back pressure regulator bubble tight when in the closed position.

* * * * *